United States Patent
Tiemeyer (10) Patent No.: US 12,421,887 B2
(45) Date of Patent: Sep. 23, 2025

(54) COOLANT VALVE, COOLING SYSTEM, AND MOTOR VEHICLE COMPRISING A COOLING SYSTEM

(71) Applicant: HELLA GmbH & Co. KGaA, Lippstadt (DE)

(72) Inventor: Sebastian Tiemeyer, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/634,918

(22) Filed: Apr. 13, 2024

(65) Prior Publication Data
US 2024/0280044 A1 Aug. 22, 2024

Related U.S. Application Data

(63) Continuation of application No. PCT/EP2022/073179, filed on Aug. 19, 2022.

(30) Foreign Application Priority Data

Oct. 13, 2021 (DE) .................... 10 2021 126 508.8

(51) Int. Cl.
*F01P 7/14* (2006.01)
*F16K 31/04* (2006.01)

(52) U.S. Cl.
CPC ........... *F01P 7/14* (2013.01); *F01P 2007/146* (2013.01); *F16K 31/041* (2013.01)

(58) Field of Classification Search
CPC ..... F01P 7/14; F01P 2007/146; F16K 31/041; F16K 27/003
See application file for complete search history.

(56) References Cited

U.S. PATENT DOCUMENTS

| 5,275,201 A * | 1/1994 | Zimmerly ........... F15B 13/0835 |
| | | 137/625.5 |
| 10,665,908 B2 | 5/2020 | Krull et al. |
| 2017/0138248 A1* | 5/2017 | Lee .................... F01P 7/165 |
| 2021/0164579 A1* | 6/2021 | Karve ................. F16K 11/165 |

FOREIGN PATENT DOCUMENTS

| WO | WO2017223232 A2 | 12/2017 |
| WO | WO2021004418 A1 | 1/2021 |

OTHER PUBLICATIONS

International Search Report dated Nov. 29, 2022 in corresponding application PCT/EP2022/073179.

* cited by examiner

*Primary Examiner* — Syed O Hasan
(74) *Attorney, Agent, or Firm* — Muncy, Geissler, Olds & Lowe, P.C.

(57) ABSTRACT

A coolant valve for a cooling system of a motor vehicle, comprising a valve housing with housing openings, at least one valve body for automatically fluidically connecting at least two of the housing openings, and at least one valve seal for sealing the coolant valve. The valve housing has a first housing cylinder, having housing openings with a first valve body, and a second housing cylinder having housing openings with a second valve body. The first housing cylinder has a first housing plane with the first valve body and a second housing plane without a valve body. The second housing cylinder has at least one second housing plane with the second valve body and the two housing cylinders are fluidically connected together solely by the second housing planes.

12 Claims, 9 Drawing Sheets

COOLANT VALVE, COOLING SYSTEM, AND MOTOR VEHICLE COMPRISING A COOLING SYSTEM

This nonprovisional application is a continuation of International Application No. PCT/EP2022/073179, which was filed on Aug. 19, 2022, and which claims priority to German Patent Application No. 10 2021 126 508.8, which was filed in Germany on Oct. 13, 2021, and which are both herein incorporated by reference.

BACKGROUND OF THE INVENTION

Field of the Invention

The present invention relates to a coolant valve for a cooling system of a motor vehicle, to a cooling system for a motor vehicle, and to a corresponding motor vehicle.

Description of the Background Art

Coolant valves for cooling systems, cooling systems, and motor vehicles equipped therewith are already known from the state of the art in numerous design variants. The known coolant valves for cooling systems comprise a valve housing with a plurality of housing openings, each for the fluidic connection of a coolant line of the cooling system, at least one valve body, rotatably disposed in the valve housing, for automatically fluidically connecting at least two of the housing openings depending on a rotational position of the at least one valve body, and at least one valve seal, arranged between the valve housing and the at least one valve body for sealing, the coolant valve.

Compared to vehicles with internal combustion engines, vehicles with electric drives have the disadvantage, for example, that distribution of the heat generated by the engine places more complex demands on the vehicle's cooling system. Whereas with an internal combustion engine, only the engine heat has to be dissipated through a coolant circuit, which only requires one coolant circuit even in the case of an additional use of the engine heat for heating the vehicle interior, electrically powered vehicles usually require multiple separate coolant circuits. On the one hand, excess engine heat must be dissipated and, on the other hand, a vehicle battery and the vehicle interior must either be cooled or heated, depending on the ambient temperature of the vehicle, in order to ensure an optimal functioning of the electrically powered motor vehicle. Further, the vehicle battery must be heated, for example, in the case of low ambient temperatures, even if no excess engine heat needs to be dissipated or if the vehicle has been put into operation but the vehicle's engine produces no or at least no significant waste heat. In addition to a cooling device for the coolant of a coolant circuit, a heating device is therefore usually also required which increases a coolant temperature when necessary. Unlike in the case of vehicles with internal combustion engines, multiple separate coolant circuits are usually required to be able to efficiently regulate the engine temperature, the battery temperature, and the interior temperature of a vehicle. These coolant circuits must be supplied and controlled by cooling systems for multiple coolant circuits.

The known cooling systems for motor vehicles comprise multiple coolant circuits, having a coolant tank with an interior which is set up to store a coolant, multiple coolant lines which are set up to feed the coolant from the coolant tank into at least one coolant circuit, and tank electronics which are set up to control the respective cooling system.

An example of the supplying and control of multiple coolant circuits for an electric vehicle is disclosed in document WO 2017 223 232 A2, which corresponds to US 2017/0373359. The document shows a coolant tank, for example, for an electric vehicle, which has various components, arranged in its interior, to produce multiple coolant circuits.

This is the starting point for the invention at hand.

SUMMARY OF THE INVENTION

It is therefore an object of the present invention of improving a coolant valve, a cooling system, and a motor vehicle with a cooling system.

This object is achieved by a coolant valve, which is characterized in that the valve housing has a first housing cylinder, having housing openings, with a first valve body, rotatable about a first axis of rotation, and a second housing cylinder, having housing openings, with a second valve body, rotatable about a second axis of rotation, wherein the two axes of rotation are arranged parallel to one another and the first housing cylinder has a first housing plane with the first valve body and a second housing plane without a valve body along the first axis of rotation, and wherein the second housing cylinder has at least one second housing plane with the second valve body, along the second axis of rotation, and wherein the two housing cylinders are fluidically connected together solely via the second housing planes. Further, this object is achieved by a cooling system of a motor vehicle with the coolant valve and by a motor vehicle with the coolant valve.

In particular, a significant advantage of the invention is that a coolant valve, a cooling system, and a motor vehicle with a cooling system are improved. Due to the design of the coolant valve, the cooling system, and the motor vehicle according to the invention, the space, material, production, and assembly efficiency of the cooling system can be maximized. For example, via the coolant valve of the invention, it is possible to significantly reduce structurally the number of components, the assembly and disassembly effort, the space required for the cooling system of the invention, and finally also the costs and the total weight of the cooling system of the invention. Further, it is possible to realize very complex cooling systems, therefore, cooling systems with a large number of coolant lines and interconnection options for these coolant lines, in a simple manner in terms of design and production technology via the coolant valve of the invention. The above-mentioned objectives, therefore, the realization of a complex cooling system, on the one hand, and the reduction of this cooling system in structural terms, on the other hand, can be achieved simultaneously via the present invention in contrast to the prior art.

In principle, the coolant valve can be freely selected within wide suitable limits in terms of type, operating mode, material, and dimensioning. See, for example, the relevant explanations in this regard in the introduction to the description, particularly with regard to electromobility. Accordingly, the valve seal can also be freely selected within wide suitable limits, so that it can be designed, for example, as a separate seal or as an integral part of the respective valve body and/or the valve housing.

An advantage of the coolant valve of the invention provides that the first housing cylinder and/or the second housing cylinder, if the second housing cylinder has a first and second housing plane, each have a fluidic connection between the first housing plane and the second housing plane. In this way, the number of possible interconnections of different coolant lines via the coolant valve is additionally increased.

In principle, the first valve body and the second valve body can be freely selected in terms of type, function, material, dimensions, and shape within wide suitable limits. It is provided expediently that the first valve body and/or the second valve body are formed cylindrical or spherical in shape. The combination of housing cylinders, on the one hand, and cylindrical or spherical valve bodies, on the other, is particularly advantageous in terms of design and production technology.

A further advantage of the coolant valve of the invention provides that the first valve body, in a section perpendicular to the first axis of rotation, is at least partially designed as a profile that is open on one side, preferably that this profile of the first valve body is formed U-shaped. As a result, the first valve body is formed particularly suitable for use in the coolant valve of the invention. This is because, for example, the number of possible coolant line interconnections via the coolant valve of the invention is additionally increased hereby in a simple manner in terms of design and production technology, wherein a fluidic connection between the first and second housing plane of the first housing cylinder can also be easily implemented.

The second valve body, in a section perpendicular to the second axis of rotation, can be designed as a circular ring segment, preferably that the circular ring segment extends between greater than or equal to 100° and less than or equal to 180° about the second axis of rotation. In this way, the second valve body is particularly easy to execute in terms of design and production technology. This example has the further advantage that, despite the aforementioned simplicity, a large number of coolant line interconnections are made possible via the second valve body.

The first valve body and the first housing cylinder and/or the second valve body and the second housing cylinder can each be designed to be coordinated with one another in such a way that, when the respective valve body is rotated for the purpose of transferring the coolant valve from a first valve state to a second valve state during the aforementioned rotation, a third valve state of the coolant valve with an undesired fluidic connection of multiple housing openings is prevented. As a result, during the transition of the coolant valve of the invention from a first valve state with a desired interconnection of coolant lines to a second valve state with a desired interconnection of coolant lines, undesired interconnections of coolant lines are effectively prevented, so that undesired coolant flows are avoided. Accordingly, the efficiency of the coolant valve of the invention is significantly improved.

The first valve body and the first housing cylinder and/or the second valve body and the second housing cylinder can each be designed to be coordinated with one another in such a way that a degree of opening of at least one of the housing openings can be regulated as a function of the rotation of the respective valve body. In this way, in the case of this housing opening, not only is a setting between no coolant flow or a complete coolant flow possible, but in addition in the case of this housing opening, partial coolant flows can be set via the respective valve body. Accordingly, a coolant flow can be divided into different coolant lines as desired. This also includes the fact that a partial flow of the coolant is circulated.

In principle, the cooling valve of the invention can be freely selected within wide suitable limits according to type, operating mode, material, dimensioning, and arrangement. See, for example, the relevant explanations, especially with regard to motor vehicles designed as electric vehicles.

The at least one coolant valve can be designed as merely a single coolant valve. As a result, the cooling system of the invention is optimized in terms of design and production technology as well as with regard to installation space, cost, and weight, because all control tasks in the cooling system of the invention can be carried out via a single coolant valve of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A first example of a coolant valve of the invention for the cooling system of the invention of the vehicle of the invention is shown purely as an example in FIGS. 1a to 5b.

Figure 3A:
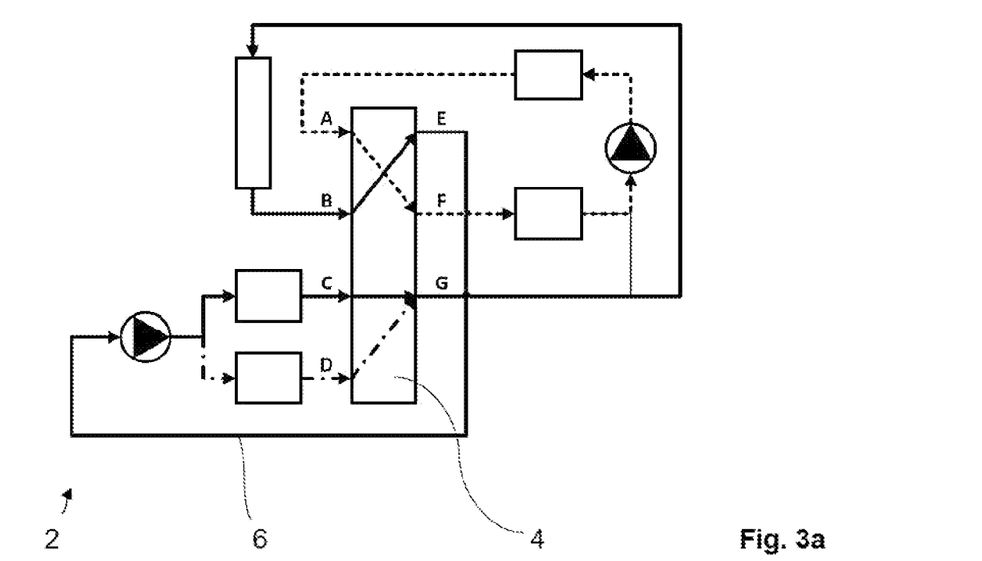
FIGS. 3a and 3b show the example according to FIGS. 1a to 2d in a first valve state, with the cooling system (FIG. 3a), and in a depiction analogous to FIGS. 1a to 2d (FIG. 3b)
Figure 4A:
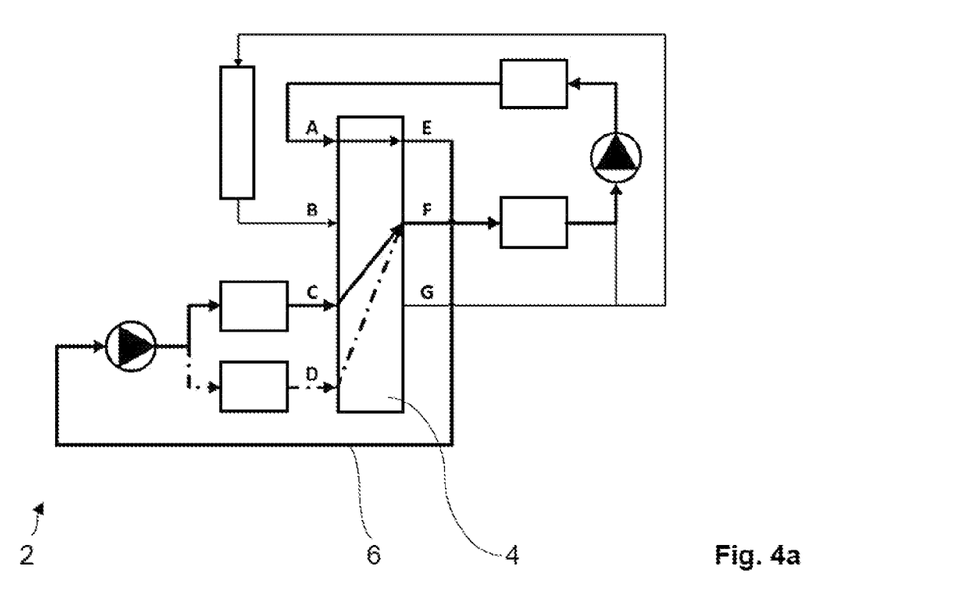
FIGS. 4a to 4b show the example according to FIGS. 1a to 2d in a second valve state, with the cooling system (FIG. 4a), and in a depiction analogous to FIGS. 1a to 2d (FIG. 4b)
Figure 5A:
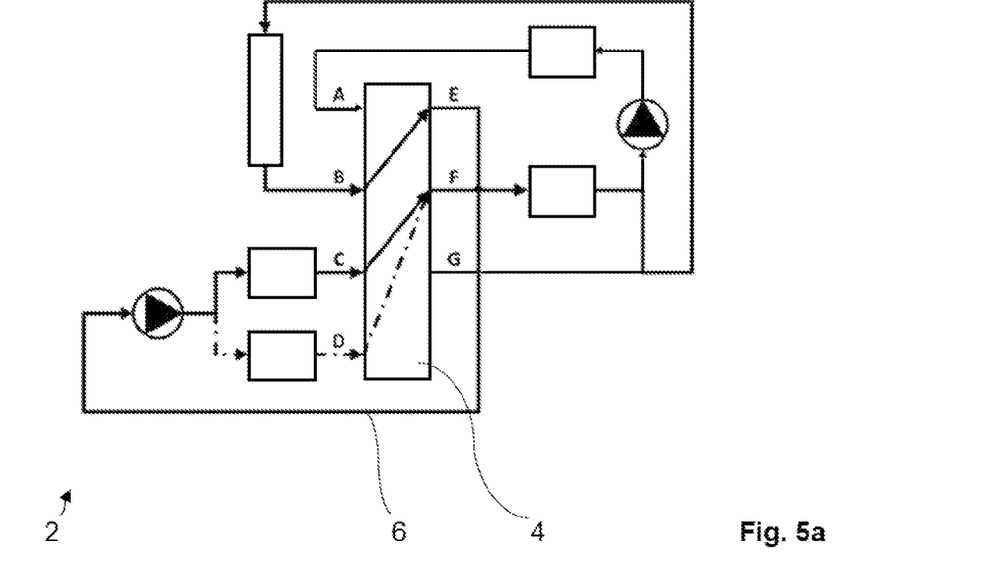
FIGS. 5a to 5b show the example according to FIGS. 1a to 2d in a third valve state, with the cooling system (FIG. 5a), and in a depiction analogous to FIGS. 1a to 2d (FIG. 5b)

The vehicle can be designed as an electric vehicle and has cooling system 2 shown only in FIGS. 3a, 4a, and 5a.

Cooling system 2 comprises only a single coolant valve 4 and a plurality of coolant lines 6 fluidically connected to coolant valve 4, wherein at least two of coolant lines 6 can be automatically fluidically connected together via coolant valve 4. The further details of cooling system 2 are not explained in more detail here and essentially correspond to conventional cooling systems for electric vehicles. Also see the relevant explanations in the introduction to the description.

Coolant valve 4 comprises a valve housing 8 with a plurality of housing openings A to G, each for the fluidic connection of one of coolant lines 6 of cooling system 2, a first and a second valve body 10, 12, rotatably arranged in valve housing 8, for the automatic fluidic connection of at least two of housing openings A to G depending on a rotational position of the two valve bodies 10, 12, and at least one valve seal arranged between valve housing 8 and valve bodies 10, 12, for sealing coolant valve 4.

Valve housing 8 has a first housing cylinder 14, having housing openings A, B, E, F, with first valve body 10 rotatable about a first axis of rotation, and a second housing cylinder 16, having housing openings C, D, G, with second valve body 12 rotatable about a second axis of rotation, wherein the two axes of rotation are arranged parallel to one another and first housing cylinder 14 has along the first axis of rotation a first housing plane with first valve body 10, as shown at the top in the respective image plane of FIGS. 1*a* to 1*c*, 2*a* to 2*d*, 3*b*, 4*b*, and 5*b*, and a second housing plane without a valve body, as shown at the bottom in the respective image plane of FIGS. 1*a* to 1*c*, 2*a* to 2*d*, 3*b*, 4*b*, and 5*b*, and wherein second housing cylinder 16 in the present first example also has along the second axis of rotation a first housing plane shown at the top in the respective image plane of FIGS. 1*a* to 1*c*, 2*a* to 2*d*, 3*b*, 4*b*, and 5*b* and a second housing plane with second valve body 12, as shown at the bottom in the respective image plane of FIGS. 1*a* to 1*c*, 2*a* to 2*d*, 3*b*, 4*b*, and 5*b*, and wherein the two housing cylinders 14, 16 are fluidically connected together solely via the second housing planes.

Further, first housing cylinder 14 and second housing cylinder 16 each have a fluidic connection here between the first housing plane and the second housing plane. These fluidic connections are each symbolized by a circle with a cross in FIGS. 1*a* to 1*c*, 2*a* to 2*d*, 3*b*, 4*b*, and 5*b*, if visible in the respective depicted valve state of coolant valve 4.

In the present example, first valve body 10 and second valve body 12 are formed cylindrical, wherein the respective cylindrical shape refers to the shape enveloping the respective valve body 10, 12. Moreover, first valve body 10, in a section which is shown in FIGS. 1*a* to 1*c*, 2*a* to 2*d*, 3*b*, 4*b*, and 5*b* and is perpendicular to the first axis of rotation, is at least partially designed as a profile that is open on one side, wherein this profile of first valve body 10 is formed U-shaped here. In contrast to this, second valve body 12, in a section which is shown in FIGS. 1*a* to 1*c*, 2*a* to 2*d*, 3*b*, 4*b*, and 5*b* and is perpendicular to the second axis of rotation, is designed as a circular ring segment, wherein the circular ring segment extends essentially 180° about the second axis of rotation in the example.

Further, first valve body 10 and first housing cylinder 14 as well as second valve body 12 and second housing cylinder 16 are each designed to be coordinated with one another in such a way that, when the respective valve body 10, 12 is rotated for the purpose of transferring coolant valve 4 from a first valve state to a second valve state during the aforementioned rotation, creation of a third valve state of coolant valve 4 with an undesired fluidic connection of multiple housing openings A to G is prevented. This will be explained in more detail below.

First valve body 10 and first housing cylinder 14 as well as second valve body 12 and second housing cylinder 16 are also designed to be coordinated with one another in such a way that a degree of opening of at least one of housing openings A to G can be controlled as a function of the rotation of the respective valve body 10, 12. This will also be explained in more detail below.

The cooling system of the invention of the motor vehicle of the invention with the coolant valve of the invention according to the example will be explained in more detail hereinbelow with reference to FIGS. 1*a* to 5*b*.

Figure 1A:
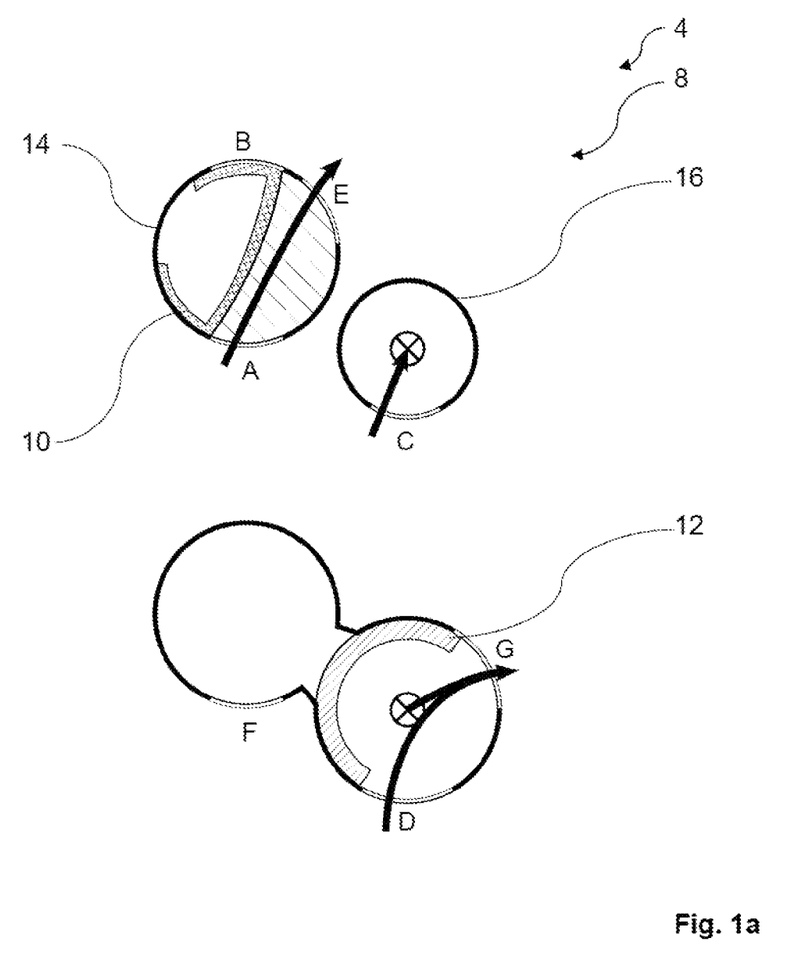
FIGS. 1a to 1c show an example of a coolant valve for the cooling system of the invention of the motor vehicle of the invention in three cross sections through the first housing plane (respective image plane at the top) and the second housing plane (respective image plane at the bottom), each in a top plan view.
Figure 1B:
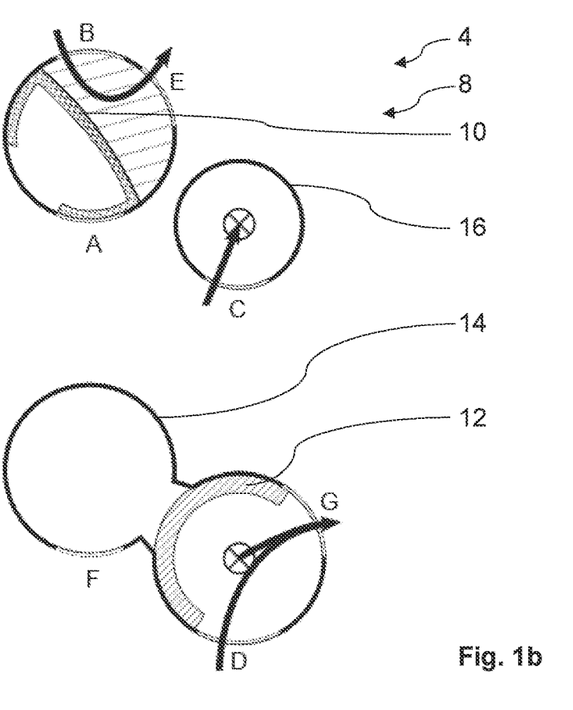
Figure 1C:
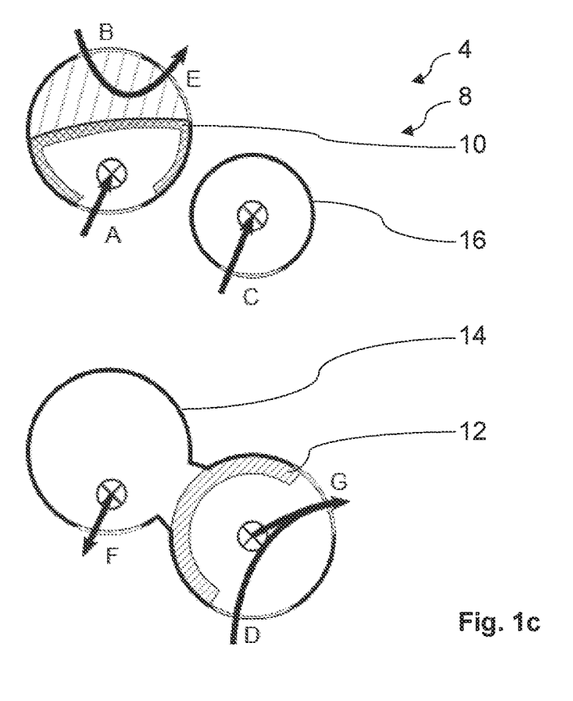

Coolant valve 4 is shown in FIGS. 1*a* to 1*c* in three different valve states, wherein, for the sake of simplicity, only first valve body 10, shown at the top in the respective image plane and arranged in the first housing plane of first housing cylinder 14, is rotated about the first axis of rotation perpendicular to the image plane. Second valve body 12, shown at the bottom in the respective image plane and arranged in the second housing plane of second housing cylinder 16, is shown only in a single exemplary position in FIGS. 1*a* to 1*c*. The solid arrows symbolize the coolant flows. For example, it can be seen from FIG. 1*a* that in the shown valve state of coolant valve 4, housing openings A and E are fluidically connected together via first valve body 10, whereas housing openings C, D, and G are fluidically connected via second valve body 12. As emerges further from FIG. 1*a*, the coolant can flow into coolant valve 4 through housing opening C, then flow from the first housing plane into the second housing plane via the fluidic connection between the first and second housing planes of second housing cylinder 16, in order to finally flow out of coolant valve 4 through housing opening G together with coolant flowing into coolant valve 4 through housing opening D. The same applies to the other valve states of coolant valve 4 as shown in FIGS. 1*b* and 1*c*.

As a result, for example, three different valve states of coolant valve 4 can be set via first valve body 10, namely, firstly, the fluidic connection between housing opening A and housing opening E, wherein housing opening B is closed via first valve body 10, secondly, the fluidic connection between housing opening B and housing opening E, wherein housing opening A is closed via first valve body 10 and, thirdly, the fluidic connection between housing opening B and housing opening E and between housing opening A and housing opening F.

Figure 2A:
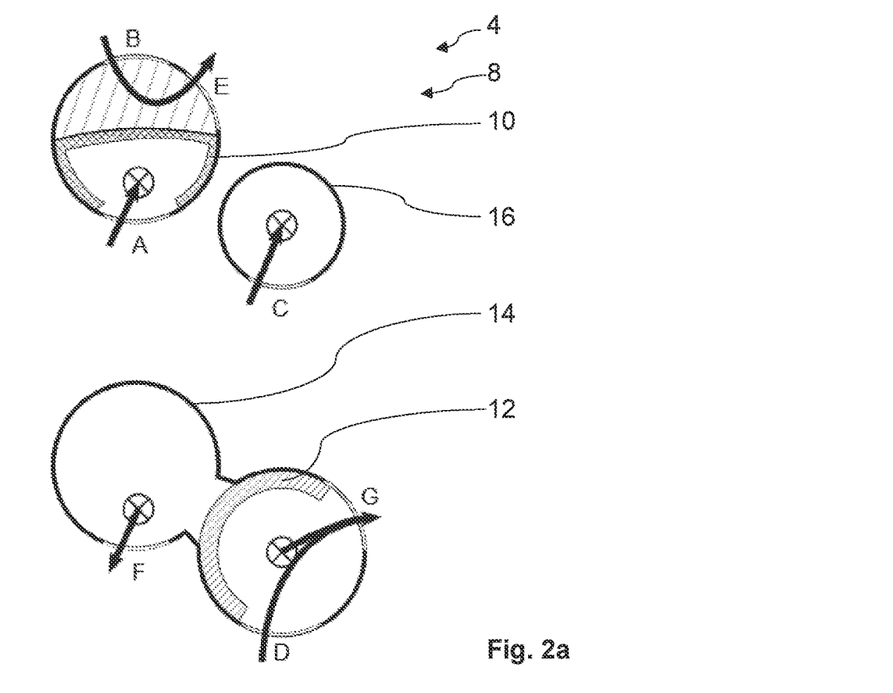
FIGS. 2a to 2d show the example according to FIGS. 1a to 1c in four further cross sections, in an analogous depiction.
Figure 2B:
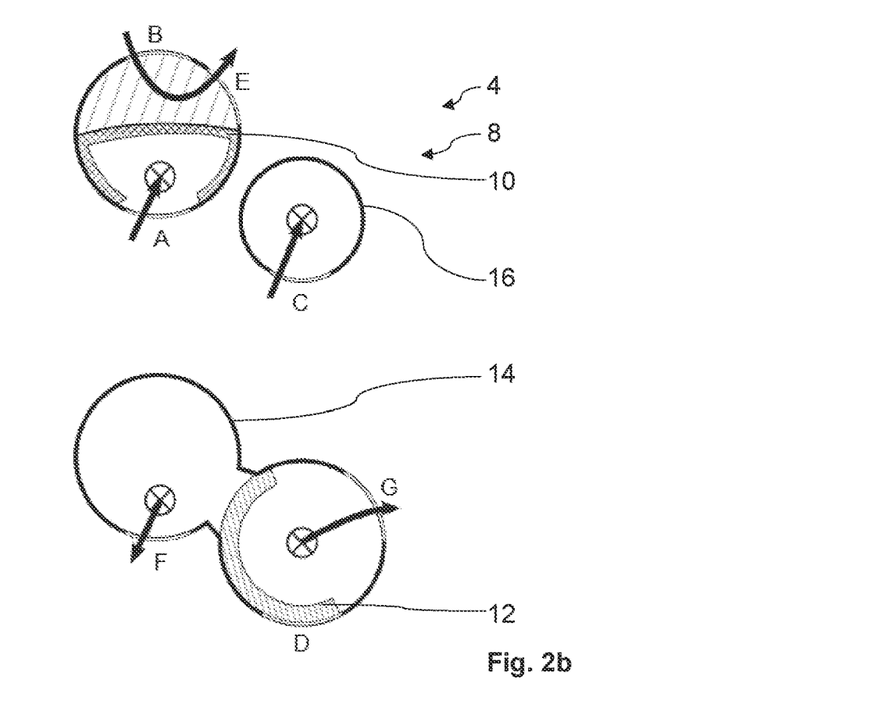
Figure 2C:
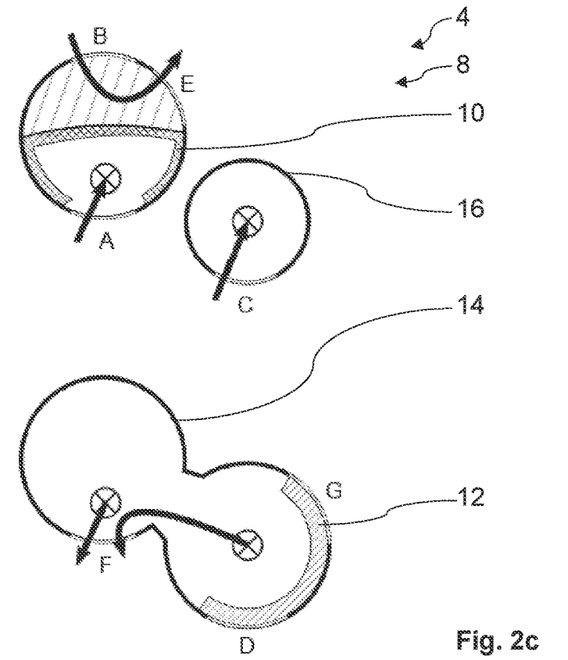
Figure 2D:
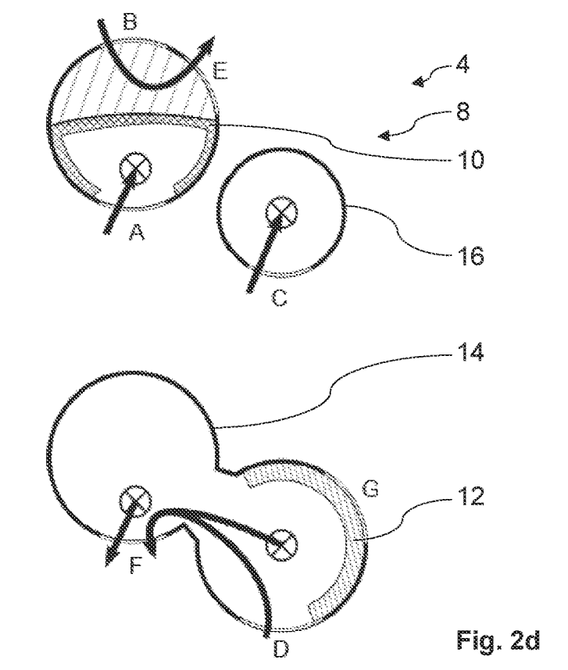

Coolant valve 4 is shown in FIGS. 2*a* to 2*d* in four additional different valve states. In contrast to the valve states of coolant valve 4 shown in FIGS. 1*a* to 1*c*, for the sake of simplicity, only first valve body 10, shown at the top in the respective image plane and arranged in the first housing plane of first housing cylinder 14, is shown here in a single exemplary position. Second valve body 12, shown at the bottom of the respective image plane and arranged in the second housing plane of second housing cylinder 16, is rotated about the second axis of rotation perpendicular to the image plane in FIGS. 2*a* to 2*d*. The solid arrows again symbolize the coolant flows. For example, it can be seen from FIG. 2*a* that in the valve state shown of coolant valve 4, housing openings B and E as well as A and F are fludically connected together via first valve body 10, whereas housing openings C, D, and G are fluidically connected via second valve body 12. As emerges further from FIG. 2*a*, the coolant can flow into coolant valve 4 through housing opening A, then flow from the first housing plane into the second housing plane via the fluidic connection between the first and second housing planes of first housing cylinder 14, in order to finally flow out of coolant valve 4 through housing opening F. For the fluidic connection between housing openings C, D, and G, reference can be made here to the relevant explanations in the previous paragraph. As with FIGS. 1a to 1c, the other valve states of coolant valve 4 as shown in FIGS. 2b to 2d should be read analogously.

As a result, for example, four different valve states of coolant valve 4 can be set via second valve body 12, namely, firstly, the fluidic connection between housing opening C and housing opening G as well as between housing opening D and housing opening G, wherein the fluidic connection from second housing cylinder 16 to the housing opening F is closed, secondly, the fluidic connection between housing opening C and housing opening G, wherein housing opening D and the fluidic connection from second housing cylinder 16 to housing opening F are closed via second valve body 12, thirdly, the fluidic connection between housing opening C and housing opening F, wherein housing openings D and G are closed via second valve body 12 and, fourthly, the fluidic connection between housing opening C and housing opening F and between housing opening D and housing opening F, wherein housing opening G is closed via second valve body 12.

Figure 3B:
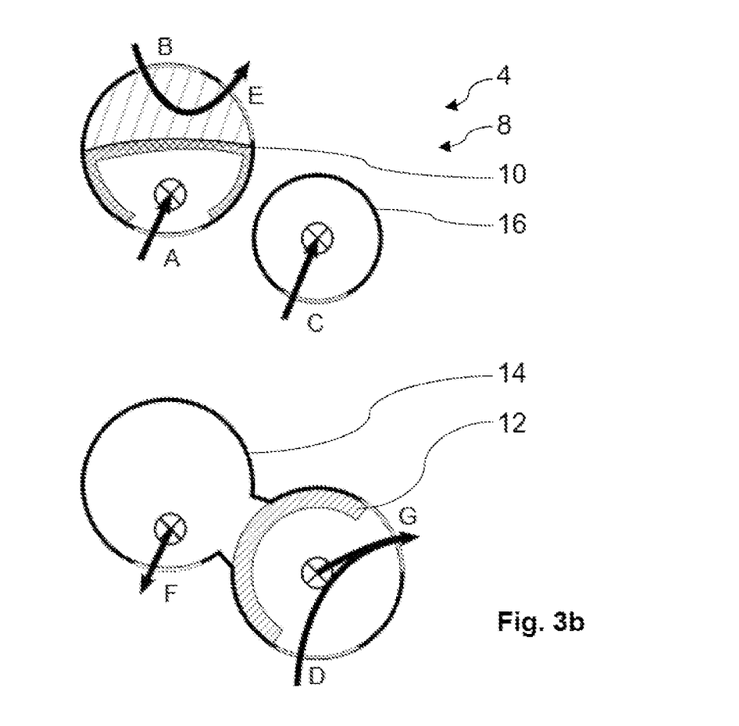
Figure 4B:
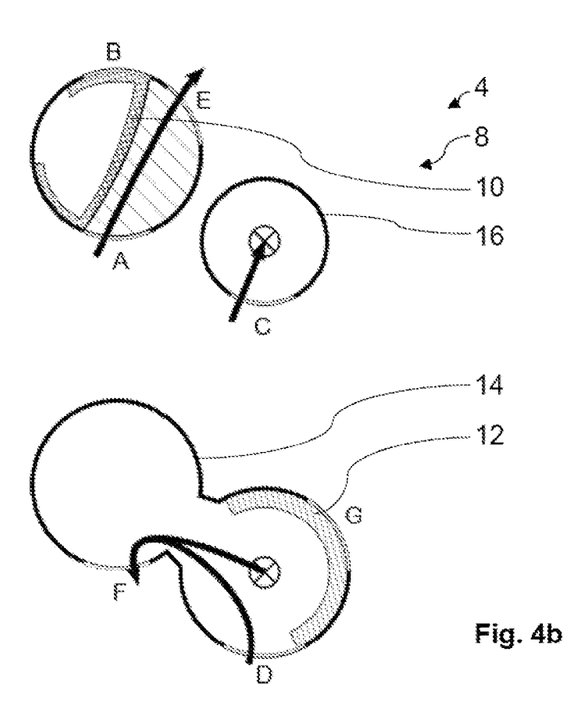
Figure 5B:
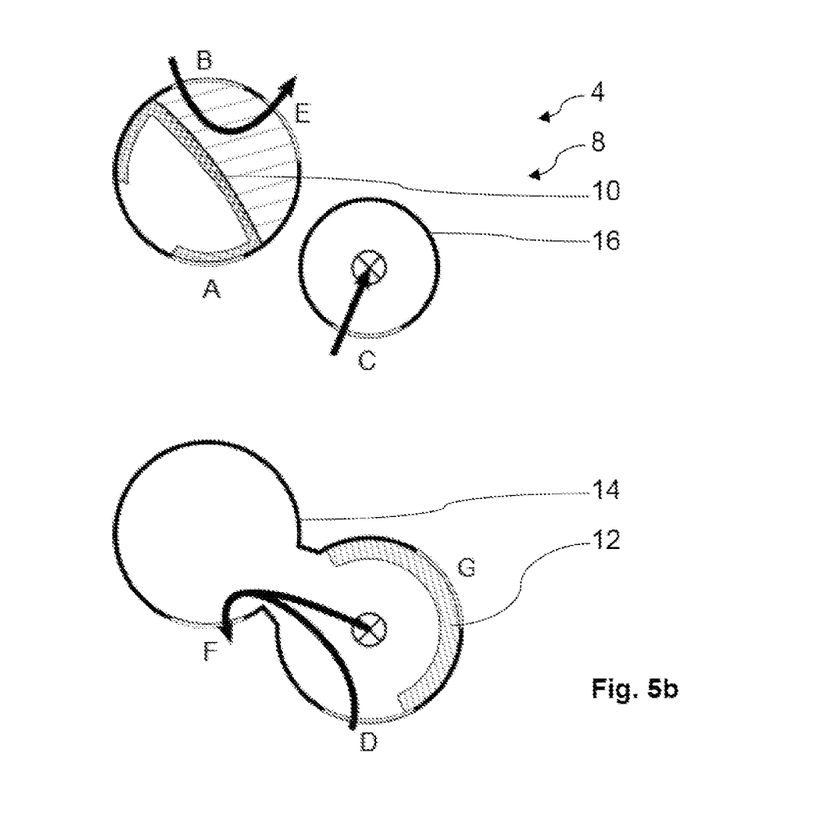
Figure 6A:
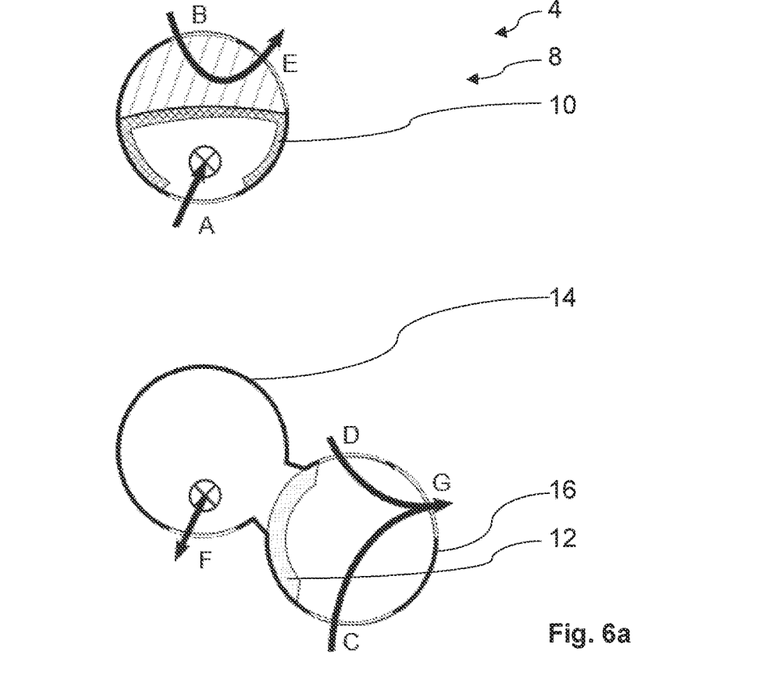
FIGS. 6a to 6d show an example of the coolant valve of the invention for the cooling system of the invention of the motor vehicle of the invention in four cross sections through the first housing plane (image plane at the top) and the second housing plane (image plane at the bottom), each in a top plan view.
Figure 6B:
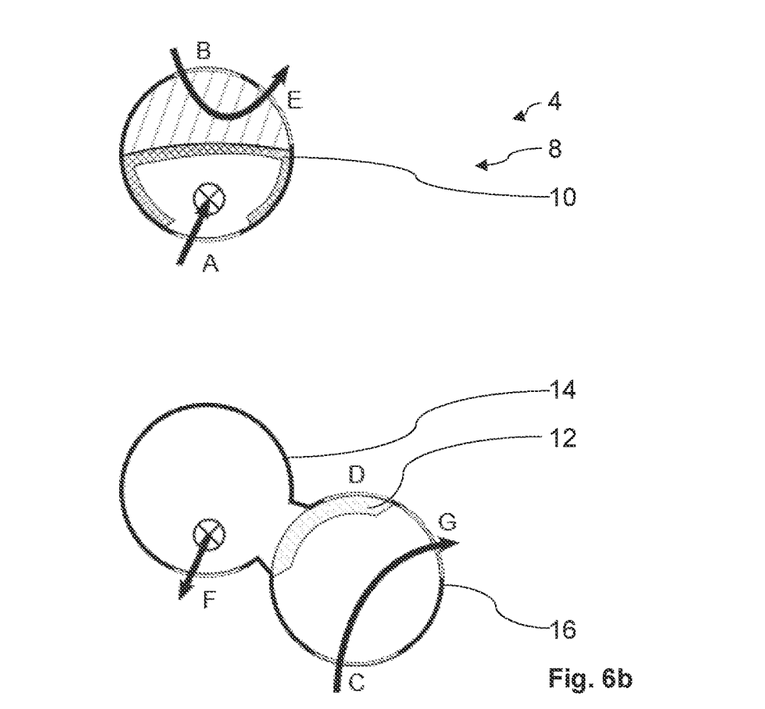
Figure 6C:
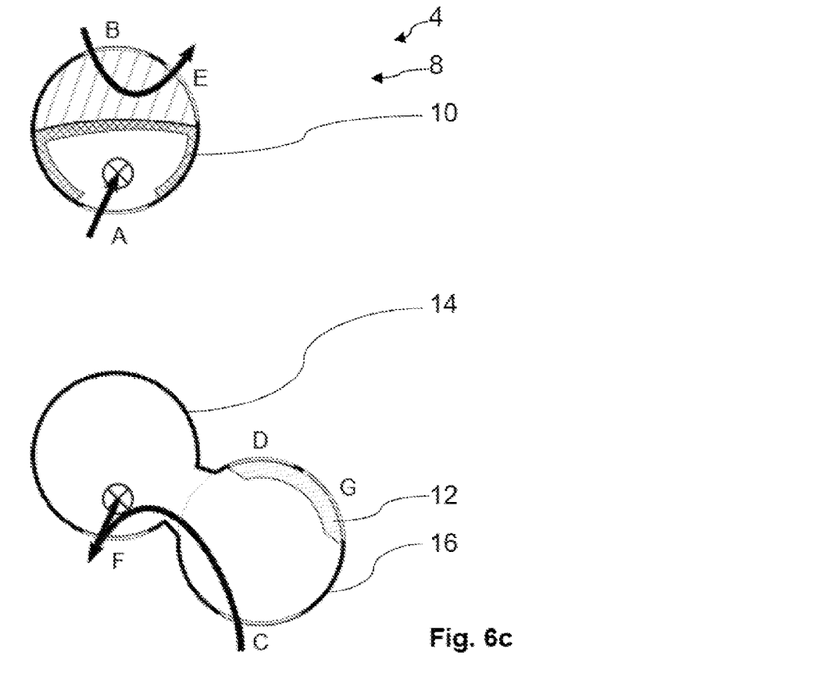
Figure 6D:
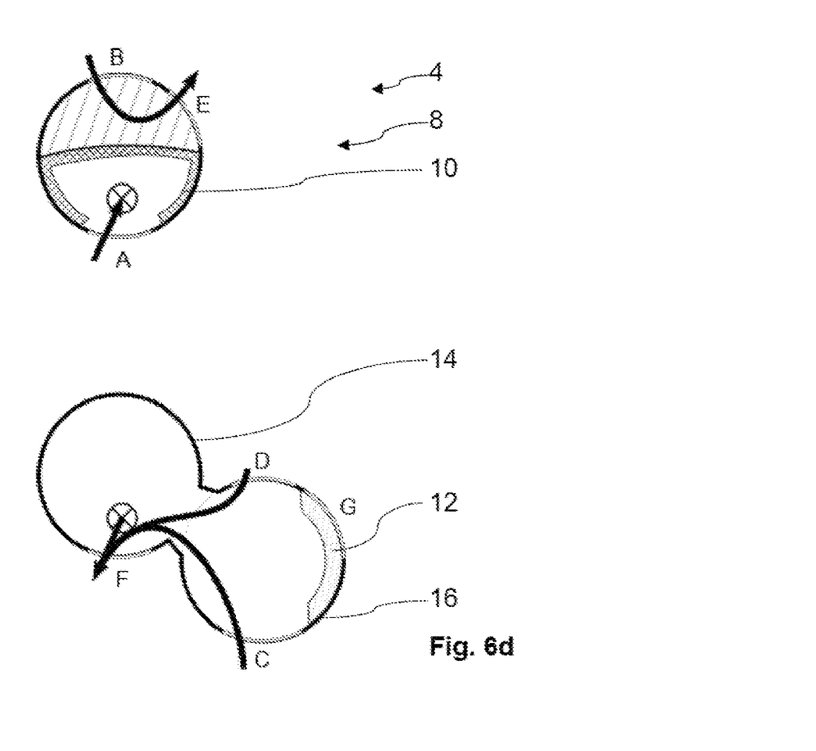

Three valve states of coolant valve 4 are shown in FIGS. 3a to 5b purely as an example, wherein FIGS. 3a, 4a, and 5a each show cooling system 2 with coolant valve 4 and FIGS. 3b, 4b, and 5b each show coolant valve 4 in the corresponding valve state analogous to FIGS. 1a to 1c and FIGS. 2a to 2d.

Via the first valve state of coolant valve 4 as shown in FIGS. 3a and 3b, two separate coolant circuits can be realized, as shown by arrows with solid and dashed lines. In this valve state, housing openings B and E as well as A and F are fluidically connected together via first valve body 10 and housing openings C, D, and G via second valve body 12. The fluidic connection between the aforementioned housing openings D and G is shown in FIG. 3a via arrows with dash-dotted lines, wherein the coolant flow of this fluidic connection can be infinitely adjusted via second valve body 12 and housing opening D. Also refer to FIG. 2a already explained above.

FIGS. 4a and 4b show a second valve state of coolant valve 4, in which a first common coolant circuit can be realized. This is shown in FIG. 4a via solid lines and comprises the fluidic connections between housing openings A and E as well as C and F. Further, the fluidic connection of housing openings D and F allows a controlled flow through a coolant circuit arranged parallel to the aforementioned common coolant circuit. This parallel coolant circuit is symbolized with dash-dotted lines in FIG. 4a.

Further, FIGS. 5a and 5b show a third valve state of coolant valve 4, in which a second common coolant circuit can be realized. This is shown in FIG. 4a also via solid lines and comprises the fluidic connections between housing openings B and E as well as C and F. Moreover, the fluidic connection of housing openings D and F again allows a controlled flow through a coolant circuit arranged parallel to the aforementioned common coolant circuit. This parallel coolant circuit is symbolized with dash-dotted lines in FIG. 5a.

A second example of the coolant valve of the invention is shown in FIGS. 6a to 6d. Identical or similarly acting components are provided with the same reference characters as in the first example according to FIGS. 1a to 5b. Further, the second example is explained only to the extent of the differences from the first example. Otherwise, reference is made to the above explanations for the first example.

In the second example according to FIGS. 6a to 6d, second housing cylinder 16 has only the second housing plane, which is arranged parallel to the second housing plane of first housing cylinder 14. Analogous to the first example, the two second housing planes are fluidically connected here as well via a connecting channel. Accordingly, housing openings C, D, and G are all located here in the second housing plane, the only housing plane of second housing cylinder 16. Further, second valve body 12 is also designed here, in a section perpendicular to the second axis of rotation, as a circular ring segment, wherein the circular ring segment in the present second example extends by approximately 108° about the second axis of rotation. Analogous to the first example according to FIGS. 2a to 2d, in FIGS. 6a to 6d of the present second example, first valve body 10 is only shown in a single exemplary position. This exemplary position corresponds to the exemplary position, selected according to FIGS. 2a to 2d, of first valve body 10 in the first example.

According to the present second example, for example, four different valve states of coolant valve 4 can thus be set via second valve body 12, namely, firstly, the fluidic connection between housing opening C and housing opening G and between housing opening D and housing opening G, wherein the fluidic connection of second housing cylinder 16 to housing opening F is closed via second valve body 12, secondly, the fluidic connection between housing opening C and housing opening G, wherein housing opening D and the aforementioned fluidic connection to housing opening F are closed via second valve body 12, thirdly, the fluidic connection between housing opening C and housing opening F, wherein housing openings D and G are closed via second valve body 12, and, fourthly, the fluidic connection between housing opening C and housing opening F and between housing opening D and housing opening F, wherein housing opening G is closed via second valve body 12.

The invention is not limited to the present examples.

The described examples merely serve to provide a better understanding of the structure, operating mode, and properties of the invention disclosed herein. FIGS. 1a to 6d are schematic to illustrate the functions, operating principles, technical designs, and features. In this regard, any operating mode, any principle, any technical example, and any feature, which is/are disclosed in FIGS. 1a to 6d or in the text, may be freely and arbitrarily combined with all claims, any feature in the text and in the other figures, other operating modes, principles, technical embodiments, and features which are contained in or result from this disclosure, so that all conceivable combinations are attributable to the described invention. In this regard, combinations between all individual explanations in the text, in other words, in each section of the description, in the claims, and also combinations between different variants in the text, in the claims, and in FIGS. 1a to 6d are also included. Nor do the claims limit the disclosure and thus the possible combinations of all the features shown with one another. All disclosed features are also explicitly disclosed herein individually and in combination with all other features.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A coolant valve for a cooling system of a motor vehicle, the coolant valve comprising:
    a valve housing with housing openings, in each case for a fluidic connection of a coolant line of the cooling system;

at least one valve body arranged rotatably in the valve housing to automatically fluidically connect at least two of the housing openings as a function of a rotational position of the at least one valve body; and at least one valve seal arranged between the valve housing and the at least one valve body to seal the coolant valve, wherein the at least one valve body includes a first valve body and a second valve body, and wherein the valve housing has a first housing cylinder having housing openings with the first valve body rotatable therein about a first axis of rotation, and a second housing cylinder having housing openings with the second valve body rotatable therein about a second axis of rotation, wherein the first axis of rotation and the second axis of rotation are arranged parallel to one another, wherein, along the first axis of rotation, the first housing cylinder has a first housing plane with the first valve body and a second housing plane without any valve body, wherein, along the second axis of rotation, the second housing cylinder has at least a second housing plane with the second valve body, and wherein the first housing cylinder and the second housing cylinder are fluidically connected together solely via the second housing planes.

2. The coolant valve according to claim 1, wherein the first housing plane of the first housing cylinder is fluidically connected together with the first housing plane of the second housing cylinder.

3. The coolant valve according to claim 1, wherein the first valve body and/or the second valve body are formed cylindrical or spherical in shape.

4. The coolant valve according to claim 1, wherein the first valve body, in a section substantially perpendicular to the first axis of rotation, is at least partially formed as a U-shaped profile that is open on one side.

5. The coolant valve according to claim 1, wherein the second valve body, in a section substantially perpendicular to the second axis of rotation, is designed as a circular ring segment that extends 100° to 180° about the second axis of rotation.

6. The coolant valve according to claim 1, wherein the first valve body and the first housing cylinder and/or the second valve body and the second housing cylinder are each designed to be coordinated with one another, wherein when the respective valve body is rotated for the purpose of transferring the coolant valve from a first valve state to a second valve state during the aforementioned rotation, a third valve state of the coolant valve with an undesired fluidic connection of multiple housing openings is prevented.

7. The coolant valve according to claim 1, wherein the first valve body and the first housing cylinder and/or the second valve body and the second housing cylinder are each designed to be coordinated with one another, wherein a degree of opening of at least one of the housing openings is regulated as a function of the rotation of the respective valve body.

8. A cooling system of a motor vehicle comprising:
at least one coolant valve according to claim 1; and
a plurality of coolant lines fluidically connected to housing openings of the at least one coolant valve, wherein at least two of the coolant lines are automatically fluidically connected together via the at least one coolant valve.

9. The cooling system according to claim 8, wherein the at least one coolant valve is designed as only a single coolant valve.

10. A motor vehicle comprising the cooling system according to claim 8.

11. The cooling system according to claim 1, wherein the first housing plane of the first housing cylinder is fluidically connected together with the second housing plane of the first housing cylinder, wherein the second housing cylinder further includes a first housing plane without any valve body, and wherein the first housing plane of the second housing cylinder is fluidically connected together with the second housing plane of the second housing cylinder.

12. The cooling system according to claim 1, wherein the second valve body is rotatable in the second housing plane to open and close the fluid connection between the first housing cylinder and the second housing cylinder.

* * * * *